Nov. 23, 1943.  H. J. FINDLEY  2,334,915
AUTOMOBILE HEATER
Filed Jan. 9, 1941  5 Sheets-Sheet 2

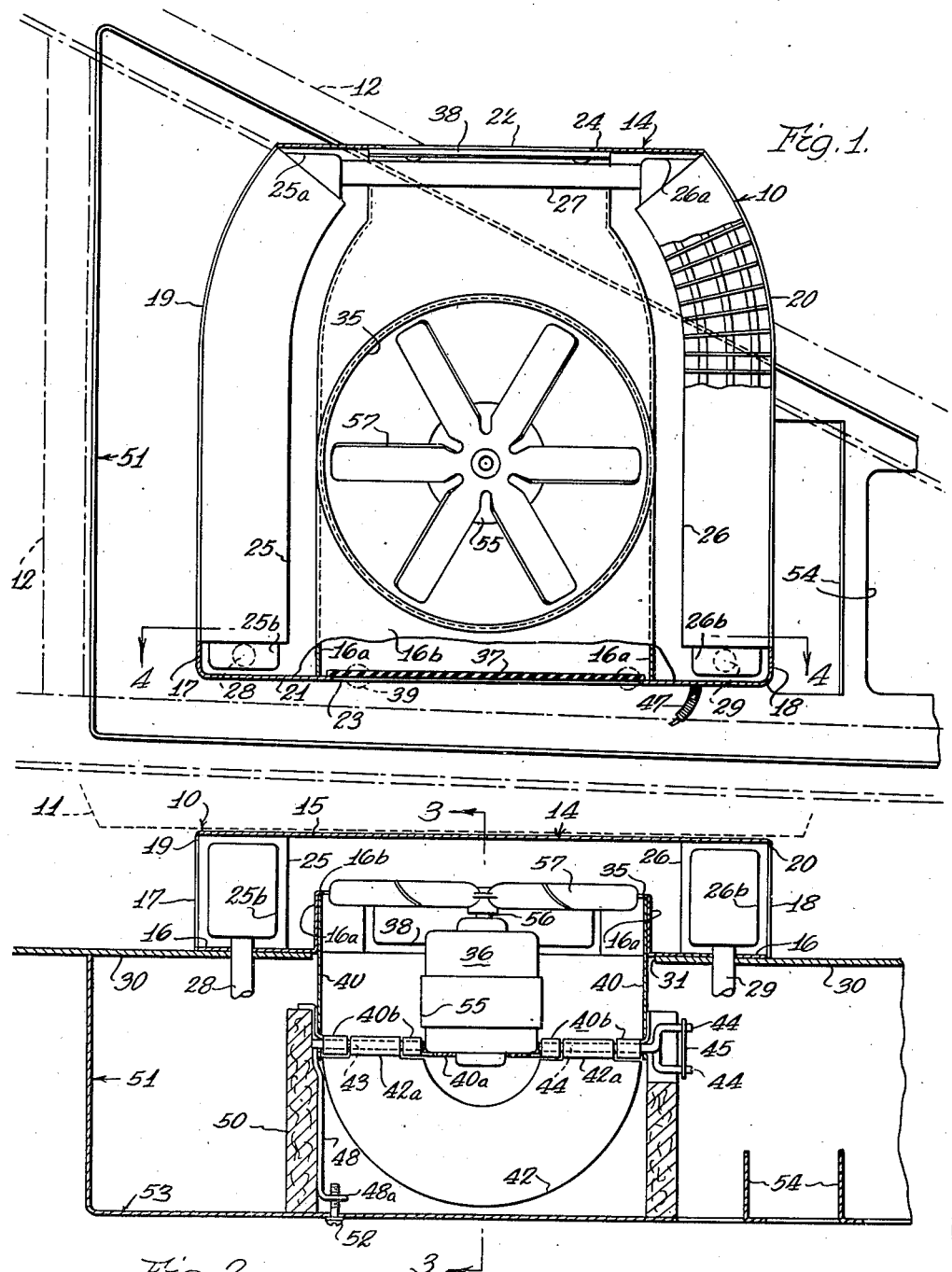

INVENTOR.
Howard J. Findley
BY John F. Stark
ATTORNEY.

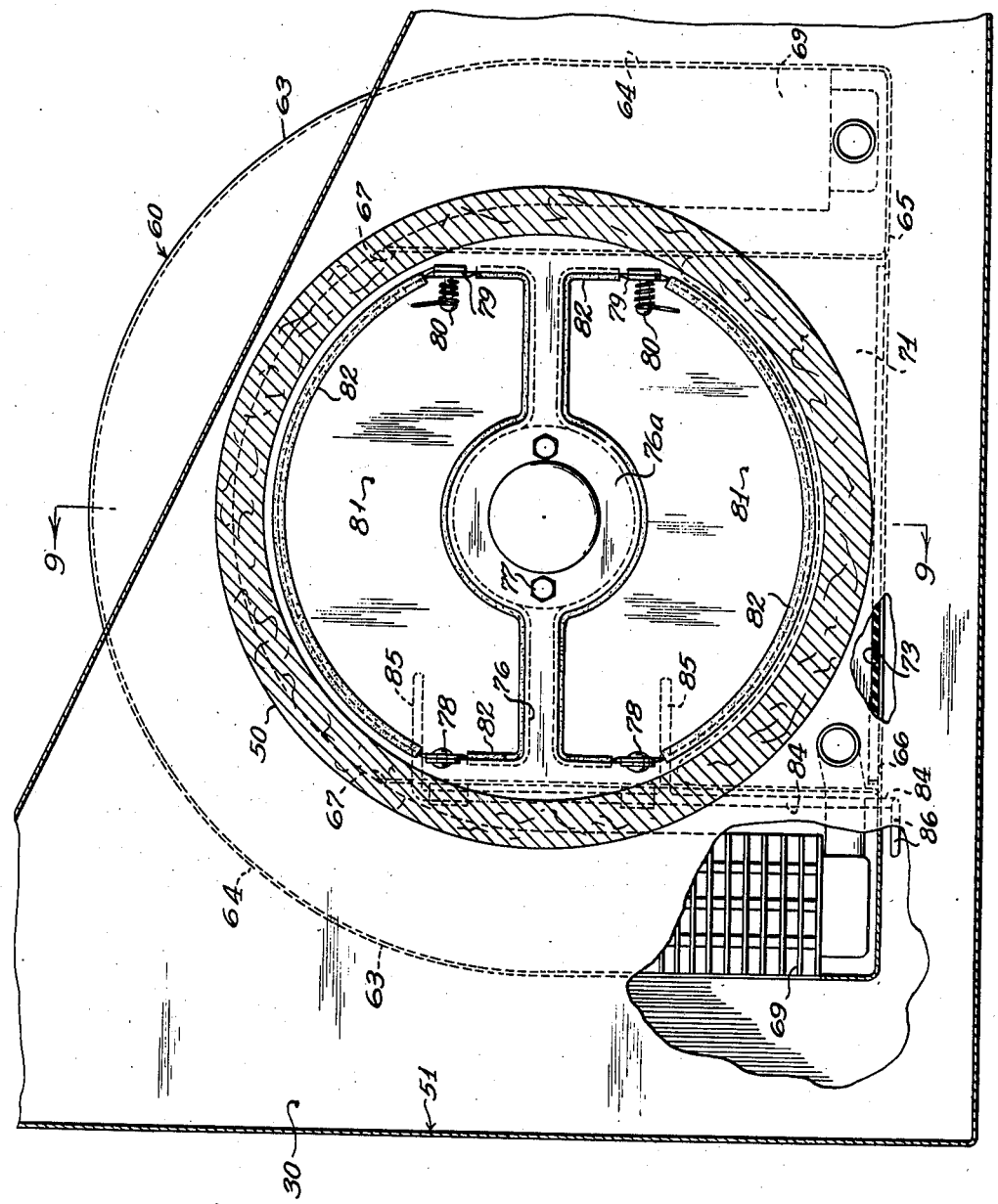

Nov. 23, 1943.                H. J. FINDLEY                2,334,915
                            AUTOMOBILE HEATER
                           Filed Jan. 9, 1941            5 Sheets-Sheet 4

INVENTOR.
Howard J. Findley
BY John F. Stark
ATTORNEY.

Nov. 23, 1943. H. J. FINDLEY 2,334,915
AUTOMOBILE HEATER
Filed Jan. 9, 1941 5 Sheets-Sheet 5

INVENTOR.
Howard J. Findley
BY John F. Stark

Patented Nov. 23, 1943

2,334,915

UNITED STATES PATENT OFFICE 2,334,915

AUTOMOBILE HEATER

Howard J. Findley, Shaker Heights, Ohio, assignor to Eaton Manufacturing Company, Cleveland, Ohio, a corporation of Ohio Application January 9, 1941, Serial No. 373,773

13 Claims. (Cl. 257—137)

This invention relates to automobile body heaters in general and more particularly concerns an automobile heater of the under-seat type embodying an improved construction and arrangement of parts comprising one or more heat-exchange cores with an air impelling means operable therebetween to force streams of fresh and recirculated air therethrough to be discharged in heated condition directly to the vehicle compartments.

Among the objects of the present invention are the provision of an automobile under-seat heater comprising a heater casing having means for the introduction of fresh air and/or recirculated air of the vehicle interior including valve means associated with said means for selective types of said air to be heated, or a blended stream of combined fresh and recirculated air; the provision in a heater of the under-seat type as above described in which said valve means controlling the recirculated air supply are pressure operated by means of the air flow thereagainst; the provision in a heater as above described provided with a fresh air intake located below the vehicle floor including air filtering and ventilated roadsplash baffle means associated therewith.

Other objects of the invention include an improved arrangement and construction for an automobile heater of the under-seat type as described of spaced heat-exchange cores joined in series in a suitably apertured casing structure with air impelling means disposed between said cores, in which recirculated air inlet openings are controlled by gravity actuated rubber flapper valves, and rotatable valve means for regulating the fresh air inlet opening are actuated from a remote position by a Bowden wire control, including an annular bonnet shaped filter therearound protected from road splash by a louvered shield member underlying the same.

Further and other objects and advantages of the invention reside in the novel combination and arrangement of parts when considered in conjunction with the accompanying drawings forming a part of this specification, and pointed out with particularity in the appended claims.

In the drawings like reference characters refer to corresponding parts throughout the several views, and in which:

Fig. 1 is a sectional plan view through a portion of an automobile illustrating an automobile under-seat heater of a preferred form embodying the teaching of this invention; and Fig. 2 is a longitudinal sectional view of the heater of Fig. 1 and showing the same disposed below the overlying front seat of the automobile; and Fig. 3 is a transverse vertical sectional view through the under-seat heater shown in Fig. 2, substantially on the line 3—3 thereof; and Fig. 4 is a vertical sectional view through a portion of the under-seat heater shown in Fig. 1, substantially on the line 4—4 thereof; and Fig. 5 is an elevational view of the fresh air inlet valve control showing the same in an open position; and Fig. 6 is a further elevational view of the valve control of Fig. 5 showing the same in a closed position.

Fig. 7 is a bottom sectional plan view of a modified form of under-seat heater.

Figure 3:
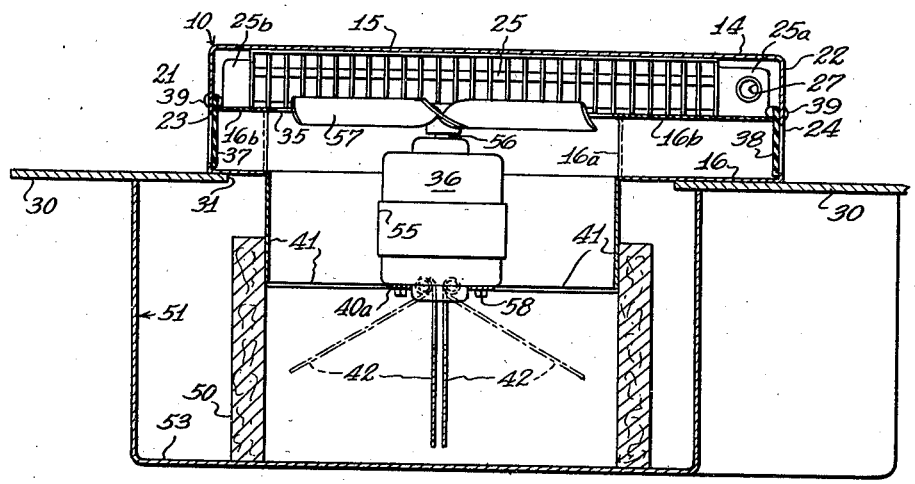

It has been known heretofore to construct under-seat automobile heaters of the general type shown here with one or more heat exchange cores of unequal size or heating capacity to provide proportional discharge of heated air in selected amounts to the front and rear compartments of a vehicle and to connect the same in series with the heating medium supplied thereto passing first through the core of smaller heating capacity, and including air impelling means inclined relatively to the smaller core so as to favor the air discharge toward the core of larger heating capacity. It has also been known to provide under-seat heaters generally with recirculated and filtered fresh air inlet openings of various arrangements, but, as will be disclosed hereinafter, and insofar as this applicant is aware, no under-seat automobile heater of the improved construction and arrangement of parts as herein disclosed has ever been proposed before.

For a complete understanding of the novel construction and arrangement of this improved heater including the manual and automatic valve mechanism for control of the fresh and recirculated air inlet openings thereto reference may be had to Figs. 1 to 4, inclusive, of the drawings where the numeral 10 designates generally a heater under the front seat 11 of an automobile in position to deliver heated streams of fresh and/or recirculated air directly to front and rear compartments thereof. In Fig. 1 a portion of the underlying chassis or frame members 12 of the automobile have been disclosed in broken line so as to show better for purposes of illustration, the location of channels and a cross member of the frame in respect to the position the heater 10 may assume. The heater 10 may comprise a casing, generally designated 14 which includes top and bottom walls 15 and 16, a pair of arcuate end walls 17 and 18 having discharge openings 19 and 20 therein and also including a pair of side walls 21 and 22 having air inlet openings 23 and 24 therein.

Within the casing 14 a pair of spaced heat-exchange cores 25 and 26 are disposed adjacent the end wall discharge openings 19 and 20. The cores may be of unequal size or heating capacity and connected in series with the heating medium supplied thereto passed first through the smaller capacity core, or, as in this instance, may be of equal size and connected in series by the pipe 27. The pipe 27 communicates header tanks 25a and 26a disposed upon one end of the cores 25 and 26, while the opposite ends thereof have tanks 25b and 26b connected thereto and with which are joined inlet and outlet supply pipes 28 and 29, respectively. Heating medium may be supplied from the cooling system of the automobile engine and is preferably supplied first to the inlet pipe 28 entering the heat-exchange 25 so as to supply the heating medium first to this core for delivery to the front compartment of the vehicle where the heat loss and cold outside air infiltration is normally greatest. The heat-exchange cores 25 and 26 and adjacent casing end walls may be arcuately curved in their longitudinal length, as shown in this instance, to provide longitudinal as well as transverse delivery of heated air to the vehicle body when the heater is disposed to one side or the other of the central longitudinal axis of the vehicle.

The heater 10 may be conveniently disposed between the overlying front seat 11 of the vehicle, dividing the same into front and rear compartments, and the floor 30 thereof with the heater casing 14 having its bottom wall 16 resting directly on the floor 30, including an opening 31 therein, through which a portion of the heater casing depends. The bottom wall 16 of the heater casing has an upturned section 16a which may extend in spaced relation to the end walls 17 and 18 and the cores 25 and 26 adjacent thereto from side to side of the casing and that terminates in a flat upper wall 16b substantially at a level equal to or above the air inlet openings 23 and 24 in the side walls 21 and 22 so as to include said inlet openings in a separate section within the main heater casing. In the flat upper wall 16b, of the upturned section 16a is a central circular opening 35 and in which air impelling means generally designated 36 is caused to rotate.

Figure 4:
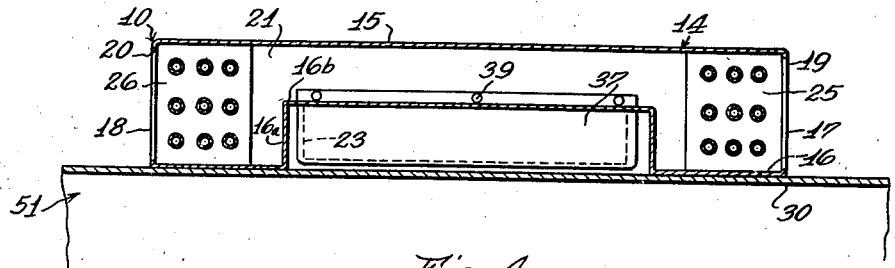

The air inlet openings 23 and 24 in the side walls 21 and 22 of the casing form the inlet source for the supply of recirculated air which is obtained from the vehicle body interior and heated in a forced passage through the heater 10. On the inner face of the side walls 21 and 22 a pair of light-weight flexible flat closures 37 and 38 overlie the margins of the openings 23 and 24 respectively, and are adapted to open inwardly from an integral hinge means secured adjacent to the top side of the openings in said walls and are arranged to be swung inwardly under the action of the air impelling means drawing recirculated air into the casing therethrough. Upon the air impeller being stopped, or when the static head of fresh air supplied to the casing, to be presently described, exceeds the capacity of the air impeller the closures 37 and 38 return or close automatically under the action of gravity or air pressure on the inner face thereof. Since the flat closure members 37 and 38 are in effect one-way valves which close automatically by gravity they will be referred to hereinafter as pressure actuated, having in mind that the fan suction for opening the valves is merely a negative pressure and excess pressure of the static head of fresh air, which may occur under some operating conditions, is a positive pressure. Preferably these one-way valves are formed from thin elastic rubber-like sheets such as latex which is light in weight and readily secured to the casing side wall by any suitable fastening means, such, as in the present instance, the rivets 39, as best shown in Figs. 3 and 4.

The selective introduction of filtered fresh air from outside the automobile, which may be combined with the recirculated air, or valved off as desired, may be effected according to this invention through the opening 31, in the floor 30 of the automobile, and the opening 35 in the raised section 16b of the heater casing bottom wall 16 overlying the same. Depending from and secured to the upturned section 16a of the bottom wall of the heater casing by any suitable fastening means is a skeleton-like frame structure which may comprise a narrow strap member 40 extending diametrically across the opening 31 in the vehicle floor but substantially below the level thereof. At the mid-section of the narrow strap member 40 is an enlarged circular portion 40a that may form a support for the air impelling means 36; and extending at diametrically opposite sides from the circular portion 40a, of the strap member 40, are a pair of bracket members 41 disposed at right angles to the strap 40, which afford additional rigidity for support of the air impelling means, and are secured at their upper ends to the heater casing bottom wall 16 by any suitable fastening means.

Figures 5, 6:
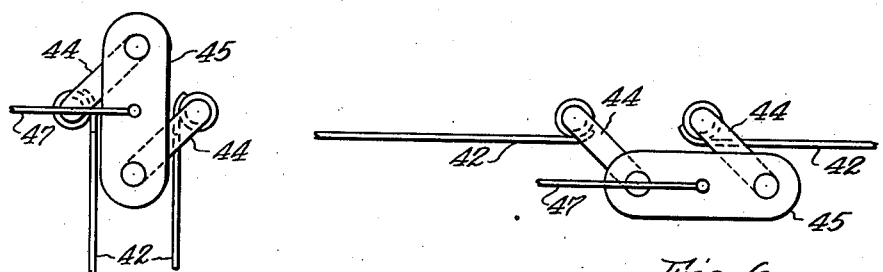

The valve structure for regulating the fresh air supplied to the heater casing in response to forward motion of the vehicle may comprise a pair of substantially semi-circular rotatable plate sections 42 each having spaced integral lugs 42a rolled into aligned annular cylinders for cooperation between spaced ears 40b, of the strap member 40, likewise rolled into annular cylinders; and in conjunction with hinge pins 43 and 44 inserted therethrough form a hinge structure for pivotal movement of the valve sections 42 through an arc of 90° from a closed horizontal position to a vertically depending open position. The outer ends of hinge pins 44 are each offset, as best shown in Figs. 5 and 6, and mount an apertured plate 45 connecting the said ends, whereby a Bowden wire control 47 secured at a suitable point thereto will provide a manual means for effecting open and closed position of the valve sections from a remote location in the automobile, preferably adjacent the driving position.

Secured to and extending below the strap member 40 are further narrow frame or bracket members 48 which have threaded apertures in right angle feet 48a bent therefrom. Around the outer periphery of the bracket members 48 is a circumscribed annular air filtering medium 50 which may be hair felt or the like, and through which all fresh outside air is strained of insects, dust or other foreign particles before delivery to the vehicle compartments.

Since the air outside and beneath the automobile when in motion may include a charge of mud, slush, ice and snow during winter driving, or water splashed from the running gear of the automobile and which would soon clog-up or freeze-up solid the passages through the air filter 50, a shroud or wind-box, generally designated 51, comprising a box-like shield structure ventilated by louver means is disposed in surrounding relation beneath the annular air filter 50 and valve sections 42 operable therein. The ventilated shroud or wind box 51 may be mounted by suitable fastening means 52 to the bracket members 48 and comprises a box like structure open at the upper end, having end and side walls in contact with the underside of the vehicle floor 30 between the frame members 12, and also includes a lower wall 53 in which are a series of louvered openings 54 disposed laterally beyond the rear end of the heater casing and so constructed and arranged as not to be normally clogged by mud or slush splashed up by the running gear. The louvers 54 may readily be formed from the bottom wall of the wind-box struck-up to form the ventilated openings therein and being in a substantially vertical position any mud or slush splashed thereagainst will have a tendency to fall back out and not be encouraged to clog up the same; also since the front end of the wind box is closed off and the louvered openings disposed adjacent the rear end thereof the forward motion of the vehicle tends to baffle any splash from the running gear from direct entry to the air filter 50 encased therein. Obviously, of course, the wind box is readily removed from the fastening means 52 for replacement of the air filter or any repairs or adjustments necessary to the fresh air valves or air impelling means.

The air impelling means 36 may comprise an electric motor 55 having a shaft 56 mounting a fan 57 thereon which is operable in the opening 35 of the raised section 16b, of the heater casing bottom wall 16. The electric motor is supported on the enlarged circular section 40a, of the strap member 40, and retained in fixed position by any suitable fastening means, such as the bolts 58.

The operation of this improved construction of under-seat automobile heater is as follows: Upon the motor 55 being energized, and under forward motion of the vehicle, air from outside the vehicle will be forced under static pressure into the wind box 51 and drawn by the air impeller 57 through the air filter 50 and supplied by the fan through the opening in wall 16b to be forced in separate streams through the spaced heat-exchange cores 25 and 26 and adjacent discharge openings 19 and 20 directly to the respective passenger compartments. Concurrently with the fresh air supplied to the heater casing, if the supply thereof is not sufficient to satisfy the capacity of the fan 57, recirculated air of the vehicle interior will be drawn by the fan from the suction side thereof through the passage in communication therewith extending from opposite sides 21 and 22 of the casing beneath the raised section 16b of the casing bottom wall 16, and in communication with valved openings 23 and 24 therein. Under this condition the fan suction will draw the flexible flapper valves 37 and 38 inward from the side walls 21 and 22 of the casing and admit recirculated air thereto, until the suction capacity of the fan is exceeded by the static head of fresh air from outside the vehicle, inducted in response to movement of the automobile, at which time they will close automatically by gravity and prevent untempered outside air from being directly discharged to the vehicle compartments. Obviously, of course, under some circumstances no supply of fresh air from outside the automobile may be desirable, and in this event plate valves 42 may be manually closed from a remote point by means of the Bowden wire control 47 and the increased suction effect produced on the flap valves 37 and 38 will readily supply a sufficient quantity of recirculated air to be heated. Under normal conditions, however, blended streams of fresh and recirculated air will be drawn or forced through the casing openings and discharged in separate streams through the cores adjacent thereto, or in any desired proportional amount to the vehicle compartments.

Figure 8:
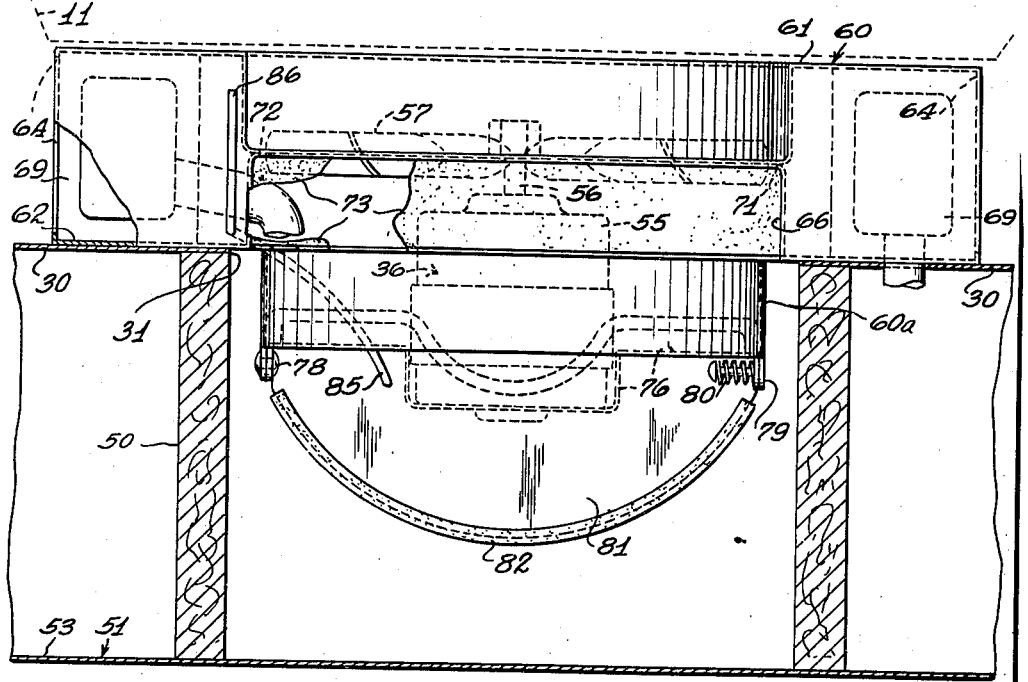
Fig. 8 is a longitudinal end view partly in section of the heater shown in Fig. 7 and showing the same disposed below the overlying front seat of the automobile.
Figure 9:
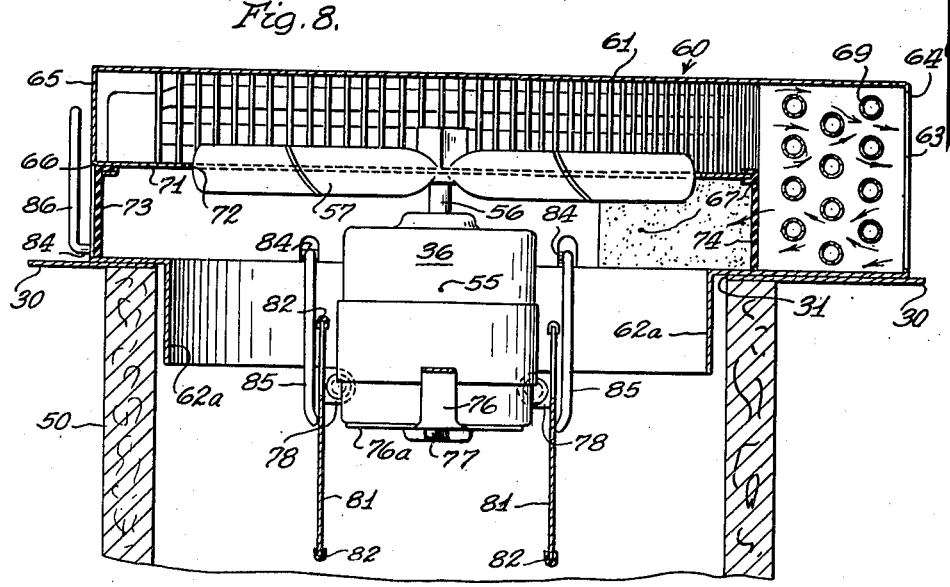
Fig. 9 is a transverse sectional view through the under-seat heater shown in Fig. 7 substantially on the line 9—9 thereof.

In Figs. 7, 8 and 9 there is shown a somewhat similar under-seat heat-exchanger, generally designated 60, but in this instance only a single substantially semi-circular core construction is used, and a modified casing structure and fresh and recirculated valve mechanism has been adapted for operation in conjunction therewith, otherwise the remaining component parts correspond to those of the previously described heater structure. The heater 60 has a casing comprising top and bottom walls 61 and 62, a generally semi-circular side wall 63, having a coextensive discharge opening 64 therein, and also including a flat end wall 65 having an air inlet opening 66 therein. Opposite the end wall air inlet opening 66 is a second air inlet opening 67 behind the lower arcuate section of a generally semi-circular heat-exchange core 69 disposed within the casing and adjacent its complementary shaped wall 63 as best shown in Fig. 9. The heat-exchange core 69 is of conventional construction having the usual header tanks at either end and inlet and outlet supply pipes which receive heat laden medium from the cooling system of the automobile engine, as previously described. This heat-exchanger 60 is also disposed in a similar manner as the first structure under the front seat 11 of the vehicle with the bottom wall 62 of the casing surrounding the floor opening 31 through which a circular cylindrical section 62a of the bottom casing wall depends to provide a fresh air inlet. The introduction of fresh air from outside the vehicle is provided for, as in the first structure, from under the vehicle with the annular air filter 50 surrounding the air inlet and the ventilated shroud or wind box 51 disposed in enveloping relation therebeneath. Within the area defined by the inner margins of the heat-exchange core is a laterally disposed casing wall 71 parallel to the top and bottom casing walls and approximately mid-way therebetween. This lateral casing wall divides the housing vertically into two chambers and provides a closed passage therebelow from the air inlet opening 66 in the end wall 65 to the semi-circular inner face of the heat-exchange core 69 where it terminates adjacent the air inlet opening 67. The casing wall 71 has a central circular aperture 72 in which the air impelling means, generally designated 36, is caused to rotate, thus providing a separate section within the main heater casing which divides the suction and pressure sides of the fan 57.

Air inlet openings 66 and 67 in the flat end wall 65 and the opposite curved wall 63 provide the source for the supply of recirculated air which is obtained from the vehicle body interior and drawn thereinto by the suction side of the fan in communication therewith. Overlying in surrounding relation the inner face of the openings 66 and 67 are gravity actuated flap valves 73 and 74, which open inward by suction and automatically close by gravity or air pressure upon the inner face thereof, and that function similar to valves 37 and 38 previously described. It will be noted that the portion of air admitted through the recirculated air inlet opening 67, in this instance, makes an initial pass through the lower portion of the arcuate section of the core below the casing wall 71 upon being drawn into the casing, and an outward pass when forced through the upper section of the core upon being discharged from the casing, thus raising the efficiency of the unit since the air is heated twice before delivery.

The modified fresh air valve mechanism for selective introduction of air from outside the vehicle consists, in part, of a substantially I shaped strap member 76, which has an enlarged circular portion 76a at its mid-point for support of the electric motor 55, and is extended diametrically across and secured to the lower marginal edge of the cylindrical air inlet 62a. Attached to outer flanges of the I shaped strap 76 adjacent diametrically opposite points on the circumference of the air inlet 62a are hinge or pivot means 78 and 79 including return torsion springs 80 upon at least one set thereof. To the pivot or hinge means 78 and 79 are rotatably secured a pair of arcuate valve sections 81 which move from a horizontally closed to a vertically open position. Around the inner and outer marginal edges of the valve sections 81 are positioned rubber sealing beads 82 which are normally pressed against the lower edge of the cylindrical inlet 62a, by the torsion springs 80. The means for actuating the valve sections 81 may consist of an elongated crank member 84, suitably journalled by the I-shaped strap member 76, and which has two integral spaced fingers 85 normal thereto contacting each of the valve sections, and an offset crank arm 86 upon the outer end thereof whereby a Bodwen wire control secured thereto will provide manual means for effecting open and closed positions of the valves from a remote location of the automobile adjacent the driving position.

The use and operation of this modified construction is substantially the same as previously described for the structure of Fig. 1, and it will suffice to point out the distinctions between the two structures. In this instance recirculated air may selectively be drawn into the casing when the vehicle is at rest through the two air inlet openings 66 and 67 therein, and the position of air inducted through inlet opening 67 since it is adjacent the inner face of the core structure will have an initial heat-transfer passage upon entering the casing as well as a second heat-transfer passage upon discharge therefrom direct to the vehicle passenger compartments. The remaining modes of operation and advantages accruing therefrom are as previously described for the device of Fig. 1, with the added advantage of having a single core and a more broad area of heated air distribution because of the increased size of the discharge opening 64.

Figure 10:
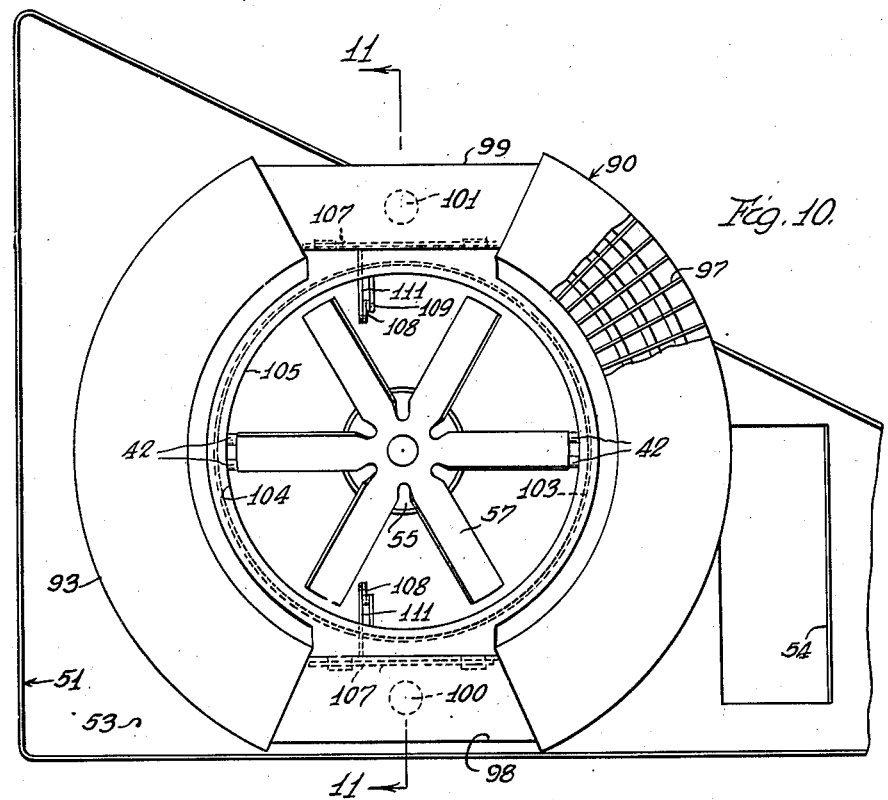
Fig. 10 is a sectional plan view somewhat similar to Fig. 1 but illustrating a modified form of vehicle under-seat heater.
Figure 11:
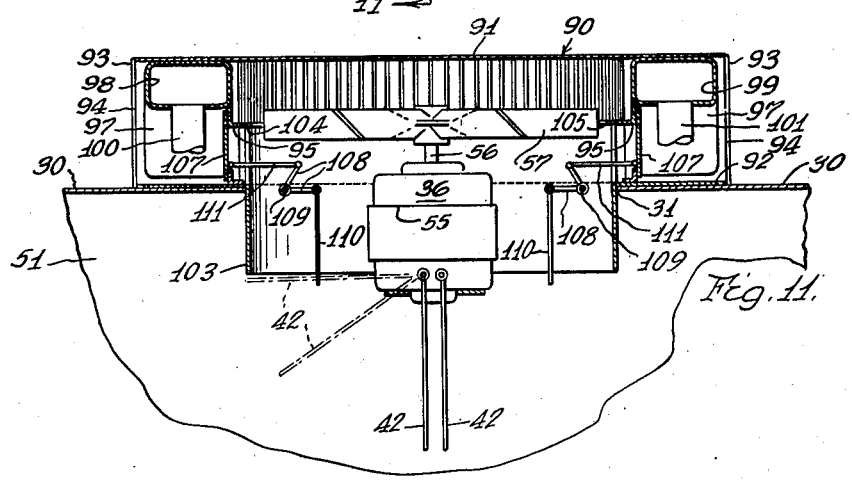
Fig. 11 is a transverse sectional view of the heater shown in Fig. 10, taken substantially on the line 11—11 thereof.

In Figs. 10 and 11 there is illustrated a further modification of an under-seat heater, somewhat similar to Figs. 1–3, but disclosing an altered valved air inlet arrangement and the use of circular heat-exchange means. Accordingly, in the present instance it will only be necessary to describe in detail the new structure, and use will be made of the same numerals for identical parts, or with a subscript for the corresponding parts where a slight alteration has been made. In this instance the heat-exchanger, generally designated 90, has a casing comprising top and bottom walls 91 and 92, a generally circular side wall 93, having a peripheral air discharge opening 94, and also including diametrically spaced air inlet openings 95. A generally circular heat-exchange means 97 of the circulating fluid type has inlet and outlet header tanks 98 and 99 with which are connected supply and discharge pipes 100 and 101 for reception of heat-exchange medium, respectively. Heat exchange medium may be taken from any source of forced circulating system, such as the cooling system of the vehicle engine, and from the inlet pipe 100 fluid enters inlet header tank 98 flows both ways through each branch of the heat-exchange means 97 thence into the outlet header tank 99 and out the discharge pipe 101. The heat-exchanger 90 is also adapted to be located under the front seat of the vehicle passenger compartment with the bottom wall 92 resting upon vehicle floor 30, overlying the opening 31 therein, and through which a cylindrical sleeve like member 103 depends to provide a fresh air inlet from beneath the vehicle. The introduction of fresh air is provided for, as in the previous instances, from beneath the vehicle with the ventilated shroud or wind box 51 disposed therebeneath. An annular air filter, such as used at 50 in the previous instances, may also be placed around the ring 103 to strain the air entering the box 51.

Within the area of the generally circular heat-exchange means 97 a laterally disposed casing wall 104 divides the fan chamber into top and bottom sections and has a large central aperture 105 in which the fan 57 rotates. The upper portion of the sleeve member 103 is extended to and terminated against the underside of casing wall 104 and except for a pair of openings in line with the diametrically opposed openings 95 completes the separation of the suction and pressure sides of the fan. A pair of movable closures or plate valves 107 control the flow of recirculated air from the vehicle interior through the openings 95, while the pair of pivoted valve sections 42, as previously described, control the influx of fresh air from beneath the vehicle through the sleeve member 103. A linkage composed of crank members 108, pivoted about axes 109, and including attached levers 110, arranged to be contacted and actuated by valve sections 42, and levers 111, which are secured at their free ends to each of the valves 107, control reverse operation of the induction of recirculated or fresh air into the heat-exchanger casing. That is to say, upon actuation of the fresh air valves 42 from an open to a closed position, as indicated by the dotted lines, by any suitable means, not shown, such as the Bowden wire control 47 previously described, the valves 107 are simultaneously moved to an open position, and vice versa.

The use and operation of this modified structure is distinctive from the previously described devices in the respect that either fresh or recirculated air may be inducted as desired, or any proportional amounts of each by partial manipulation of the reversally linked valve controls. It will be apparent that either fresh or recirculated air is moved from the suction side of the fan 57 to the upper part of the casing or pressure side of the fan and circulated in all radial directions horizontally down and out the air passages in the heat-exchange means 97 to the peripheral or side wall opening 93 of the casing for discharge to the vehicle compartments. The remaining attendant advantages and modes of operation accruing therefrom are as previously described for the device of Fig. 1, with the added advantages of a single heat-exchange means somewhat more economical than that shown in Fig. 7 while the effective coverage of the scope of the area of the tempered air delivery is equal or better.

From the foregoing disclosures it will now be apparent that there has been revealed an improved construction and arrangement for automobile heaters of the under-seat type, accomplishing among other things the objects and advantages of the invention first enumerated. It is to be understood however that it is not the intention to be limited to the specific constructions of heaters shown, which are merely for purposes of illustration and other modifications will suggest themselves to those skilled in the art to which this invention relates, but to include all modifications and changes which do not constitute a departure from the spirit thereof as defined by the scope of the following claims.

What I claim is:

1. A vehicle heat-exchanger comprising, heat-exchange means having portions spaced apart to form a chamber, a walled casing enveloping said means having tempered air discharge openings therein adjacent said heat-exchange means and including a pair of opposite walls having air inlet openings for receiving recirculated air from the vehicle interior, pressure actuated valve means controlling air flow through said recirculated air inlet openings, said casing having a baffled and filtered fresh air inlet associated with its bottom wall for receiving air from outside the vehicle in response to forward motion thereof, air impelling means disposed within the chamber defined by said heat-exchange means and operable to draw combined streams of fresh and recirculated air through their respective inlet openings to be supplied to said heat-exchange means and forced in separate blended streams of fresh and recirculated tempered air through said casing discharge openings adjacent thereto.

2. A vehicle heat-exchanger comprising, heat-exchange means having portions spaced apart to form a chamber, a walled casing enveloping said means having tempered air discharge openings therein adjacent said heat-exchange means and including a pair of opposite walls having air inlet openings for receiving recirculated air from the vehicle interior, pressure actuated valve means controlling air flow through said recirculated air inlet openings, said casing having a baffled and filtered fresh air inlet associated with its bottom wall for receiving air from outside the vehicle in response to forward motion thereof, manually operable valve means for controlling the fresh air supplied to said heat-exchanger casing, air impelling means disposed within the chamber defined by said heat-exchange means and operable to draw combined streams of fresh and recirculated air through their respective inlet openings to be supplied to said heat-exchange means and forced in separate blended streams of fresh and recirculated tempered air through said casing discharge openings adjacent thereto.

3. A vehicle heat-exchanger comprising, heat-exchange means having portions spaced apart to form a chamber, a walled casing enveloping said means having tempered air discharge openings therein adjacent said heat-exchange means and including a pair of opposite walls having air inlet openings for receiving recirculated air from the vehicle interior, pressure actuated valve means controlling air flow through said recirculated air inlet openings, said casing having a baffled and filtered fresh air inlet associated with its bottom wall for receiving air from outside the vehicle in response to forward motion thereof, air impelling means disposed within the chamber defined by said heat-exchange means and operable to draw combined streams of fresh and recirculated air through their respective inlet openings to be supplied to said heat-exchange means and forced in separate blended streams of fresh and recirculated tempered air through said casing discharge openings adjacent thereto, and said pressure actuated valve means so arranged that when the static head of fresh air supplied to said casing in response to forward motion of the vehicle exceeds the air moving capacity of said air impelling means therein the valves will be closed by excess air pressure thereagainst.

4. A vehicle heat-exchanger comprising, heat-exchange means having portions spaced apart to form a chamber, a walled casing enveloping said means having tempered air discharge openings therein adjacent said heat-exchange means and including a pair of opposite walls having air inlet openings for receiving recirculated air from the vehicle interior, pressure actuated valve means controlling said recirculated air inlet openings, said casing having a baffled and filtered fresh air inlet associated with its bottom wall for receiving air from outside the vehicle in response to forward motion thereof, manually operable valve means comprising hinged arcuate sections adapted to be actuated from a remote part of the vehicle for controlling the fresh air supplied to said heat-exchanger casing, air impelling means disposed within the chamber defined by said heat-exchange means and operable to draw combined streams of fresh and recirculated air through their respective inlet openings to be supplied to said heat-exchange means and forced in separate blended streams of fresh and recirculated tempered air through said casing discharge openings adjacent thereto.

5. A vehicle heat-exchanger comprising, heat-exchange means having portions spaced apart to form a chamber, a walled casing enveloping said means having tempered air discharge openings therein adjacent said heat-exchange means and including a pair of opposite walls having air inlet openings for receiving recirculated air from the vehicle interior, pressure actuated valve means controlling air flow through said recirculated air inlet openings, said casing having a filtered fresh air inlet associated with its bottom wall for receiving air from outside the vehicle in response to forward motion thereof, air impelling means disposed within the chamber defined by said heat-exchange means and operable to draw combined streams of fresh and recirculated air through their respective inlet openings to be supplied to said heat-exchange means and forced in separate blended streams of fresh and recirculated tempered air through said casing discharge openings adjacent thereto, and a removable ventilated wind box enveloping said fresh air inlet and secured to a portion of said heat-exchanger casing.

6. An under-seat heat-exchanger for a vehicle having front and rear compartments and a seat therebetween spaced above the floor, comprising a casing adapted to be located in part between the seat and floor with a bottom portion below the floor provided with an opening therein for reception of the fresh air to said casing and having side and top walls above the floor and also end walls provided with openings for discharging air directly to said front and rear compartments, heat-exchange means having portions spaced apart to form a chamber and disposed adjacent each of said end wall openings, means for supplying fresh air to said casing including a passage extending through said floor and the bottom wall of said casing within the regions of said heat-exchange means, air impelling means disposed within the chamber defined by said heat-exchange means adapted to move said fresh air through said passage and discharged through said heat-exchange means in separate streams to the respective compartments, and valve controlled recirculated air inlet openings in the side walls of said casing so constructed and arranged that negative pressure of the air impelling means causes recirculated air to be blended with the fresh air supply and discharged in a combined stream therewith.

7. A vehicle heat-exchanger comprising, substantially semi-circular heat-exchange means defining a chamber therebetween, a casing enveloping said means having a tempered air discharge opening therein adjacent said heat-exchange means and including a pair of air inlet openings for receiving recirculated air from the vehicle interior, pressure actuated valve means controlling said recirculated air inlet openings, air impelling means disposed within the chamber defined by said heat-exchange means and operable to draw air through said valved inlet openings to be supplied to said heat-exchange means and forced in a semi-circular tempered stream through said casing discharge opening adjacent thereto, and one of said recirculated air inlet openings being disposed adjacent the inner face of said heat-exchange means whereby a portion of said recirculated air is tempered twice, once upon entrance to the heat-exchanger casing and again upon forced delivery therefrom.

8. A vehicle heat-exchanger comprising, a heat-exchange core having spaced branches, a walled casing enveloping the same having tempered air discharge openings therein adjacent said core branches and including a pair of opposite walls having air inlet openings for receiving recirculated air from the vehicle interior, air pressure actuated valve means controlling flow of air through said recirculated air inlet openings, said casing having a baffled and filtered fresh air inlet associated with its bottom wall for receiving air from outside the vehicle in response to forward motion thereof, air impelling means disposed between the branches of said core and operable to draw combined streams of fresh and recirculated air through their respective inlet openings to be supplied to said heat-exchange core and forced in blended streams of fresh and recirculated tempered air through said casing discharge openings adjacent thereto, and said pressure actuated valve means so arranged that when the static head of fresh air supplied to said casing in response to forward motion of the vehicle exceeds the air moving capacity of said air impelling means therein the valves will be closed by excess air pressure thereagainst.

9. In a vehicle heat-exchanger of the circulating fluid type, a casing having a partition dividing the interior of the casing into two compartments, a core having spaced portions defining a chamber therebetween in one of said compartments, a rotatable fan element disposed adjacent and substantially parallel to an opening in said partition and within the chamber defined by said core, said casing being provided with means for the admission of air to the fan-compartment and for the delivery of tempered air from the core-compartment, and said casing air-admission means comprising fresh and recirculated inlet openings controlled by manual valve means and pressure actuated valve means, respectively, adapted to be operated selectively and automatically under predetermined vehicle operating conditions and air moving capacity of the fan.

10. A vehicle heat-exchanger comprising, heat-exchange means having portions spaced apart to form a chamber, a walled casing enveloping said means having tempered air discharge openings therein adjacent thereto and including diametrically opposed air inlet openings in the casing side wall for reception of recirculated air from the interior of the vehicle, valve means arranged to control flow of recirculated air through said inlet openings, said casing having a fresh air inlet in its bottom wall for reception of fresh air from outside the vehicle, valve means for controlling the fresh air supply to said casing, air impelling means disposed within the chamber defined by said heat-exchange means operable to move fresh and/or recirculated air through their respective air inlet openings for forced passage through the heat-exchange means and delivery in blended streams of fresh and/or recirculated tempered air to the vehicle interior, and linkage means under control of the vehicle operator associated with each of said fresh and recirculated air valve means and joined together in such manner whereby when one of said valve means is open the other is closed.

11. A vehicle heat-exchanger comprising, a generally circular heat-exchange means defining a chamber therebetween, a substantially circular walled casing enveloping said means having tempered air discharge openings in portions of the periphery thereof adjacent thereto and including diametrically opposed air inlet openings in the casing side wall for reception of recirculated air from the interior of the vehicle, valve means arranged to control flow of recirculated air through said inlet openings, said casing having a fresh air inlet in its bottom wall for reception of fresh air from outside the vehicle, valve means for controlling the fresh air supply to said casing, air impelling means disposed within the chamber defined by said heat-exchange means operable to move fresh and/or recirculated air through their respective air inlet openings for forced passage through the heat-exchange means and delivery in blended streams of fresh and/or recirculated tempered air to the vehicle interior, and linkage means under control of the vehicle operator associated with each of said fresh and recirculated air valve means and joined together in such manner whereby when one of said valve means is open the other is closed.

12. An under-seat heat-exchanger for a vehicle having front and rear compartments and a seat therebetween spaced above the floor, comprising a casing adapted to be located in part between the seat and floor with a bottom portion below the floor provided with an opening therein for reception of fresh air to said casing and having side and top walls above the floor and also end walls provided with openings for discharging air directly to said front and rear compartments, heat-exchange means in the casing having portions spaced apart to form a chamber and disposed adjacent each of said end wall openings, means for supplying fresh air to said casing including a passage extending through said floor to the region within the chamber defined by said heat-exchange means, air impelling means disposed within the chamber of said heat-exchange means adapted to move fresh air through said passage and said heat-exchange means and discharge the same in separate streams to the respective compartments.

13. In a heat-exchanger of the circulating fluid type, a casing having a partition dividing the interior of the casing into two compartments, a core having spaced portions defining a chamber therebetween in one of said compartments, a rotatable fan element disposed adjacent and substantially parallel to an opening in said partition and within the chamber defined by said core, said casing being provided with means for the admission of air to the fan-compartment and for the delivery of tempered air from the core-compartment.

HOWARD J. FINDLEY.